(12) United States Patent
Rosenkrantz et al.

(10) Patent No.: US 10,361,863 B2
(45) Date of Patent: *Jul. 23, 2019

(54) ACCESS MANAGER

(71) Applicant: FACEFIRST, INC., Westlake Village, CA (US)

(72) Inventors: Joseph Ethan Rosenkrantz, Calabasas, CA (US); Gifford Hesketh, Newbury Park, CA (US)

(73) Assignee: FACEFIRST, INC.

( * ) Notice: Subject to any disclaimer, the term of this patent is extended or adjusted under 35 U.S.C. 154(b) by 0 days.

This patent is subject to a terminal disclaimer.

(21) Appl. No.: 16/006,696

(22) Filed: Jun. 12, 2018

(65) Prior Publication Data
US 2018/0302225 A1 Oct. 18, 2018

Related U.S. Application Data

(63) Continuation of application No. 15/701,292, filed on Sep. 11, 2017, now Pat. No. 9,998,283, which is a continuation of application No. 15/440,891, filed on Feb. 23, 2017, now Pat. No. 9,762,394.

(60) Provisional application No. 62/301,118, filed on Feb. 29, 2016.

(51) Int. Cl.
*H04L 29/06* (2006.01)
*H04L 9/32* (2006.01)
*G06F 21/32* (2013.01)

(52) U.S. Cl.
CPC ........... *H04L 9/3231* (2013.01); *G06F 21/32* (2013.01); *H04L 9/3226* (2013.01)

(58) Field of Classification Search
CPC .................................................. H04L 9/3231
See application file for complete search history.

(56) References Cited

U.S. PATENT DOCUMENTS

| | | | | |
|---|---|---|---|---|
| 7,930,201 | B1* | 4/2011 | Issa | G06Q 10/06 705/7.15 |
| 8,376,277 | B2* | 2/2013 | Costanza | B64D 7/00 244/1 R |
| 9,426,653 | B2* | 8/2016 | Becker | H04W 12/06 |
| 2002/0108413 | A1* | 8/2002 | Hyatt, Jr. | E05B 47/063 70/278.3 |
| 2007/0180262 | A1* | 8/2007 | Benson | G07B 17/00508 713/186 |
| 2009/0112473 | A1* | 4/2009 | Lu | G06Q 30/02 701/300 |
| 2009/0132381 | A1* | 5/2009 | Gangi | G06K 7/0004 705/18 |
| 2009/0282461 | A1* | 11/2009 | Haustein | G07C 9/00142 726/2 |
| 2010/0277277 | A1* | 11/2010 | Green | G07C 9/00111 340/5.72 |
| 2011/0162064 | A1* | 6/2011 | Powell | G06F 21/34 726/17 |

(Continued)

*Primary Examiner* — Ali Shayanfar
(74) *Attorney, Agent, or Firm* — Paul D. Chancellor; Ocean Law

(57) ABSTRACT

An access manager determines whether access will be granted to a guarded species or space utilizing a controller including a digital processor with a memory for storing an ID library and a transducer block coupled with the processor for accessing a plurality of different ID types and an actuator block coupled with the processor for unblocking a normally locked portal to the guarded space.

14 Claims, 10 Drawing Sheets

(56) References Cited

U.S. PATENT DOCUMENTS

| | | | | |
|---|---|---|---|---|
| 2014/0032707 | A1* | 1/2014 | Doshi | G06F 9/542 709/217 |
| 2014/0229387 | A1* | 8/2014 | Chow | G06Q 20/3829 705/71 |
| 2015/0019982 | A1* | 1/2015 | Petitt, Jr. | G06F 3/0481 715/738 |
| 2015/0024710 | A1* | 1/2015 | Becker | H04W 12/06 455/411 |
| 2015/0082033 | A1* | 3/2015 | Bruce | G06F 9/54 713/168 |
| 2015/0347734 | A1* | 12/2015 | Beigi | G06F 21/32 713/155 |
| 2015/0355613 | A1* | 12/2015 | Palmer | H04L 12/2816 700/275 |
| 2016/0180077 | A1* | 6/2016 | Lee | G06F 21/83 713/183 |

* cited by examiner

| Camera 302 | Keypad/ Keyboard 304 | RF Unit, e.g., Bluetooth 306 |
|---|---|---|
| Proximity Sensor, e.g., sonic 308 | Display, e.g., LED display 310 | Audio Unit, e.g., microphone, 312 speaker, annunciator |
| Reader, e.g.. magnetic card reader 314 | Reader, e.g., iris, fingerprint, palmprint 316 | Odor Unit, e.g., colorimetric detector 318 |

| Motor 352 | Magnetic 354 | Solenoid 356 |
|---|---|---|
| Signal 358 | Wired 360 | Wireless 362 |

| EXEMPLARY FORMS OF IDENTIFICATION |||
|---|---|---|
| Scanable ID | Biometric ID | Cooperative ID |
| badge, optical | ear/ear lobe | card |
| badge, radio frequency | face | keypad entry |
| ear/ear lobe | fingerprint | passport |
| face | gait | |
| gait | iris | |
| iris | palm print | |
| odor | | |
| proximity | voice | |

| ID TYPE | TRANSDUCER | | | | | | | | | |
|---|---|---|---|---|---|---|---|---|---|---|
| | Camera/Optical | Cap. | Color. | Mag. | Mic. | Press. | RF | Thermal | Sound | Contacts |
| optical badge | X | | | | | | | | | |
| RF badge | | | | | | | X | | | |
| card | | | | | | | | | | |
| face | X | | | | | | | | | |
| fingerprint | | | | | | | | | | |
| gait | X | | | | | | | | | |
| iris | X | | | | | | | | | |
| keypad | | | | | | | | | | |
| odor | | | X | | | | | | | |
| palm | | | | | | | | | | |
| passport | | | | | | | | | | |
| proximity | | | | | | | | | X | |
| voice | | | | | | | | | | |

FIG. 4C  400C

| ID TYPE | TRANSDUCER | | | | | | | | | |
|---|---|---|---|---|---|---|---|---|---|---|
| | Camera/Optical | Cap. | Color. | Mag. | Mic. | Press. | RF | Thermal | Sound | Contacts |
| optical badge | X | | | | | | | | | |
| RF badge | | | | | | | X | | | |
| card | | | | X | | | | | | |
| face | X | | | | | | | | | |
| fingerprint | X | X | | X | | X | | X | X | |
| gait | X | | | | | | | | | |
| iris | X | | | | | | | | | |
| keypad | | X | | | | | | | | |
| odor | | | X | | | | | | | |
| palm | X | X | | X | | X | | X | X | |
| passport | X | | | | | | | | | |
| proximity | | | | | | | | | X | X |
| voice | | | | | X | | | | | |

|  | Single ID Case 1 | Single ID Case 2 |
|---|---|---|
| Scannable ID | X |  |
| Cooperative ID |  | X |

|  | Multiple ID Case 1 | Multiple ID Case 2 | Multiple ID Case 3 | Multiple ID Case 4 |
|---|---|---|---|---|
| 1st ID | scannable | scannable | cooperative | cooperative |
| 2nd ID | scannable | cooperative | scannable | cooperative |

| ID Type   | ID Dataset      |
|-----------|-----------------|
| ID Type 1 | IDDS(ID Type 1) |
| ID Type 2 | IDDS(ID Type 2) |
| ID Type 3 | IDDS(ID Type 3) |

|          | ID Type 1                  | ID Type 2                  | ID Type 3                  |
|----------|----------------------------|----------------------------|----------------------------|
| Person 1 | IDDS(Person 1, ID Type 1)  | IDDS(Person 1, ID Type 2)  | IDDS(Person 1, ID Type 3)  |
| Person 2 | IDDS(Person 2, ID Type 1)  | IDDS(Person 2, ID Type 2)  | IDDS(Person 2, ID Type 3)  |
| Person 3 | IDDS(Person 3, ID Type 1)  | IDDS(Person 3, ID Type 2)  | IDDS(Person 3, ID Type 3)  |

|  | 1 | 2 | 3 |
|---|---|---|---|
| Person 1 | IDDS(Person 1,1) | IDDS(Person 1,2) | IDDS(Person1,3) |
| Person 2 | IDDS(Person 2,1) | IDDS(Person 2,2) | IDDS(Person 2,3) |
| Person 3 | IDDS(Person 3,1) | IDDS(Person 3,2) | IDDS(Person 3,3) |

512  514  516

ACCESS MANAGER

PRIORITY CLAIM

This application is a continuation of U.S. patent application Ser. No. 15/701,292 filed Sep. 11, 2017 which is a continuation of U.S. patent application Ser. No. 15/440,891 filed Feb. 23, 2017 (now U.S. Pat. No. 9,762,394) which claims the benefit of U.S. Provisional Patent Application No. 62/301,118 filed Feb. 29, 2016, all of which are entitled ACCESS MANAGER.

BACKGROUND

Field of the Invention

The invention relates to a managed access system. More particularly, the invention relates to systems and methods for arbitrated grants of access such as credential arbitrated grants of access to a guarded species or space.

Discussion of the Related Art

Processes involving humans as gatekeepers for checking identification of persons desiring to pass through a gate are well known. Also commonplace are simple or "dumb" electronic gatekeepers in lieu of human monitors. Perhaps the best known electronic gatekeepers are systems using inexpensive technologies such as a coded magnetic card or a keypad for entry of a secret code. Among other things, such systems expose their static test criteria and therefore present an illicit entrant with a known test to be defeated or fooled to gain access.

SUMMARY OF THE INVENTION

The present invention provides systems and methods for granting access to a guarded space or species such as credential arbitrated grants of access to a guarded space or species.

In an embodiment, an access manager for arbitrating access of credentialed persons to a guarded space includes: a controller including a digital processor and a memory coupled with the processor, the memory for storing an ID library; a transducer block coupled with the processor, the transducer block for accessing a plurality of different ID types; an actuator block coupled with the processor, the actuator block for unlocking a normally locked portal to a guarded space; for persons authorized to access the guarded space, a security protocol that specifies n>=3 different ID types to be carried by each such person; and, ID datasets that correspond to the different ID types stored in the ID library; wherein a candidate for entry into the guarded space is challenged by the access manager to present a particular ID type, the ID type determined by a random or pseudorandom selection from among ID types corresponding to ID datasets stored in the ID library.

In an embodiment, the access manager may include a feature wherein a security protocol specifies that the n different ID types be, with respect to each authorized person, randomly or pseudorandomly selected from a group of y>n ID types.

In an embodiment, the access manager may include a feature wherein the access manager challenge to present a particular ID type does not reveal the ID type but a code that is paired with the particular ID type.

In another embodiment, an access manager for arbitrating access of credentialed persons to a guarded space, the access manager comprising: a controller including a digital processor and a memory coupled with the processor, the memory for storing an ID library; a transducer block coupled with the processor, the transducer block for accessing a plurality of different ID types; an actuator block coupled with the processor, the actuator block for unlocking a normally locked portal to the guarded space; for plural persons authorized to access the guarded space, a security protocol that specifies each such person seeking such access carry ID's that provide n>=3 different ID types; and, for the carried ID's, respective ID datasets stored in the ID library; wherein a candidate for entry into the guarded space is prompted to present a form of identification randomly selected from that person's carried ID types.

In some embodiments, the access manager above wherein the prompt expresses a particular ID type and a comparison and match of i) information from a presented ID with ii) data in an ID dataset is required before the actuator block will unlock the normally locked portal. And in some embodiments, the above access manager wherein an autonomous operation before the prompt, the candidate is scanned for a first ID of a first type and a comparison and match of i) information from the first ID with ii) data in a first ID dataset is required before the actuator block will unlock the normally locked portal; and, the prompt expresses a particular ID type and a comparison and match of i) information from a presented ID with ii) data in a second ID dataset is required before the actuator block will unlock the normally locked portal. And in some embodiments one of the above access managers wherein the first ID utilizes facial recognition and the prompt requires information from an ID card. And in some embodiments, one of the above access managers wherein the autonomous operation associates the candidate with particular ID types and with particular ID datasets corresponding to the ID types; and, the second ID dataset is a dataset associated with the candidate. And in some embodiments, one of the above access managers wherein the prompt expresses a code selected from codes corresponding to respective ID types, the code known to the candidate to correspond to a particular one of the ID types; and, a comparison and match of i) information from a presented ID with ii) data in an ID dataset corresponding to the code is required before the actuator block will unlock the normally locked portal. And in some embodiments, one of the above access managers wherein in an autonomous operation before the prompt, the candidate is scanned for a first ID of a first type and a comparison and match of i) information from the first ID with ii) data in an ID dataset is required before the actuator block will unlock the normally locked portal; the prompt expresses a code selected from a set of three or more codes corresponding to respective ID types, the code known to the candidate to correspond to a particular one of the ID codes carried by the candidate; and, a comparison and match of i) information from a presented ID with ii) data in an ID dataset corresponding to the code is required before the actuator block will unlock the normally locked portal. And in some embodiments, one of the above access managers wherein the autonomous operation associates the candidate with particular ID types and with particular ID datasets corresponding to the ID types; and, the second ID dataset is a dataset associated with the candidate.

In another embodiment, an access manager for arbitrating access of credentialed persons to a guarded space, the access manager comprising: a controller including a digital processor and a memory coupled with the processor, the memory for storing an ID library; a transducer block coupled with the processor, the transducer block for accessing a plurality of different ID types; an actuator block coupled with the processor, the actuator block for unlocking a normally locked portal to the guarded space; for plural persons authorized to access the guarded space, a security protocol that specifies each such person seeking such access carry ID's that provide n>=3 different ID types; and, for the carried ID's, respective ID datasets stored in the ID library; wherein information on an ID carried by a candidate for entry into the guarded space is compared with data in an ID dataset that depends on the candidate's identity x.

And in some embodiments, the access manager above wherein (i) the dataset further depends on a random selection y from among a plurality of ID types and ii) a match between the information on the carried ID and the ID dataset data is required before the actuator block will unlock the normally locked portal. And in some embodiments, one of the above access managers wherein (i) the ID dataset further depends on a random selection y from among a plurality of ID types z where z is a function of x and ii) a match between the information on the carried ID and the ID dataset data is required before the actuator block will unlock the normally locked portal. And in some embodiments, one of the above access managers wherein the candidate is identified by an autonomous scan via a video camera and facial recognition.

BRIEF DESCRIPTION OF THE DRAWINGS

The present invention is described with reference to the accompanying exemplary figures. These figures, incorporated herein and forming part of the specification, illustrate selected embodiments of the present invention and, together with the description, further serve to explain the principles of the invention and to enable a person skilled in the relevant art to make and use the invention.

FIGS. 3A-B show transducers and actuators for use with the access manager of FIG. 1.

FIGS. 4A-C show types of identification and related transducers for use with the access manager of FIG. 1.

FIGS. 5A-B show identification categories for use with the access manager of FIG. 1.

FIGS. 5C-E show identification datasets for use with the access manager of FIG. 1.

DETAILED DESCRIPTION OF THE INVENTION

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

Figure 1:
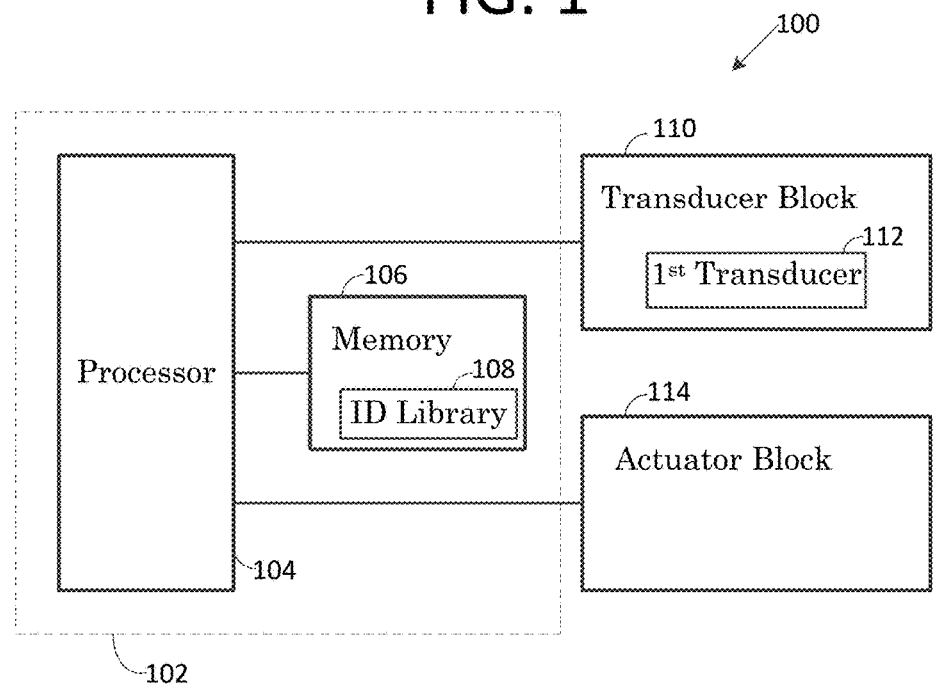
FIG. 1 shows an access manager in accordance with the present invention.

FIG. 1 shows an exemplary access manager 100. A digital processor or computer 104 is interconnected with each of a memory 106, a transducer block 110, and an actuator block 114. The processor and memory may be included in an access manager controller or local access manager controller 102. Where, as here, a controller communicates with external devices, the controller and the device(s) may be said to form a network or portion thereof.

In various embodiments the memory includes an identification or ID library, for example information including identification information in an ID library 108 stored via the memory 106. And, in various embodiments, the transducer block includes at least a first transducer 112.

Figure 2:
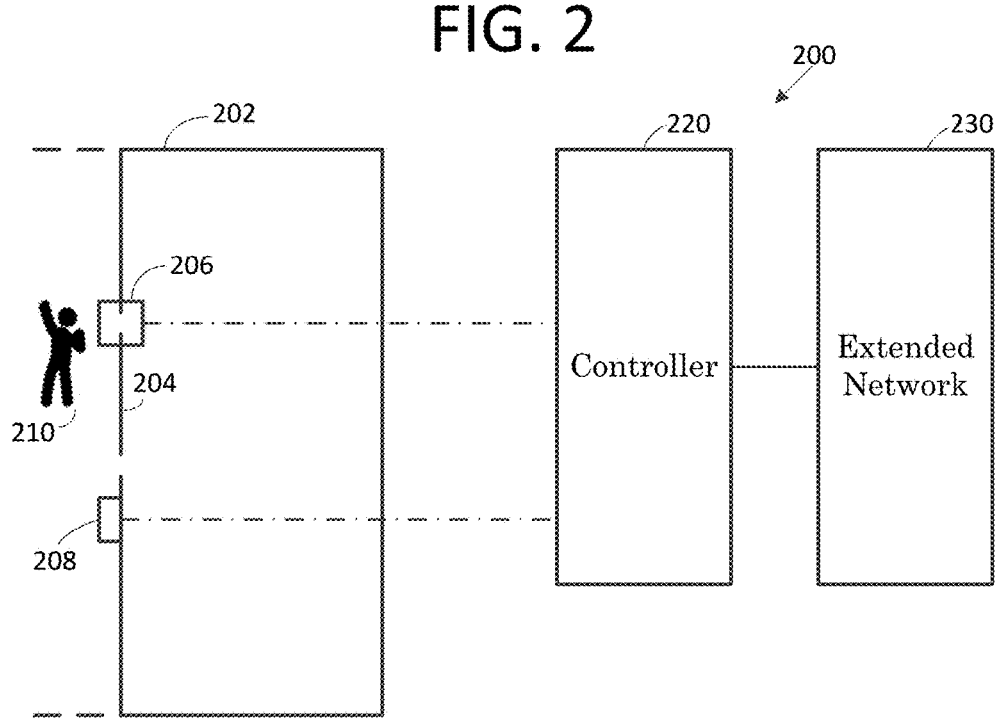
FIG. 2 shows an installation of the access manager of FIG. 1.

FIG. 2 shows an exemplary access manager installation 200. Here, human 210 access to a guarded space 202 via a door 204 is subject to action by a controller 220. In particular, a transducer block or blocks 208 includes one or more transducers for accessing identification to determine whether the human is authorized to enter the guarded space. A human subject to an access decision by the access manager may be referred to as a "candidate." When access is granted, the controller communicates with an actuator block or blocks 206 to permit access via the door. In some embodiments, the controller is a local controller interconnected with an extended network 230 and in some embodiments the ID library 108 or another ID library resides within the external network.

FIG. 3A shows a group of transducers 300A. The transducer group includes a camera 302 such as a still or video camera incorporating a pixelated light sensor, a keypad or keyboard 304, a radio frequency "RF" unit 306 such as a WiFi, RFID, bluetooth, AM, FM or similar unit, a proximity sensor 308 such as a directional or non-directional sonic sensor, a display 310 such as an alpha or graphic display, an audio unit 312 such as annunciator, speaker and/or microphone, a reader 314 such as a magnetic or optical card reader, a reader 316 such as an iris, fingerprint and/or palmprint reader, an explosives detection or odor unit 318 such as a calorimetric detector. Any one or more of these transducers or similar transducers may be located with one or more transducer blocks such as the transducer block(s) 208 mentioned above.

FIG. 3B shows a group of actuators 300B. The actuator group includes devices for pre-actuation and actuation. Shown in the figure are i) motors 352 such as any of electric, pneumatic, hydraulic and the like motors, ii) magnetic and electromagnetic devices 354 with and without moving parts for example magnetic locks, iii) solenoid devices and linear devices 356 such as an electromagnetic solenoid with a moving plunger, iv) actuator signal generators 358, v) wired devices 360, and vi) wireless devices 362.

FIGS. 4A-C show ID types and transducers 400A-C.

FIG. 4A shows exemplary types and forms of identification 400A. These identifications are organized as one or more of scannable ID, biometric ID, and cooperative ID.

The terms scannable ID and uncooperative ID refer to forms of identification that do not require overt cooperation of the person that is being identified. Scannable ID's include optical badges, RF badges, proximity, odor and selected biometric identifiers such as ear/ear lobe, face, gait, and iris.

The term biometric ID refers to a physical attribute(s) of the person that is being identified. Biometric ID's include ear/ear lobe, face, fingerprint, gait, iris, palm print, and voice.

The term cooperative ID refers to a form of identification that requires the person being identified to cooperate. Cooperative ID's include cards such as magnetic cards, code entries via keypad or keyboard, and official documents such as government documents including driver's licenses, passports, and the like.

FIG. 4B shows uncooperative ID determinations 400B. In particular, where a subject whose identification is being assessed without the subject's knowledge and/or cooperation, the table shows which ID types may be assessed and by which transducer(s). As shown, optical badges may be assessed by an optical device such as a still or video camera, radio frequency "RF" badges may be assessed by an RF device such as a WiFi or bluetooth device, a face may be assessed by the optical device, a gait may be assessed by the optical device, and an iris may be assessed by the optical device. Further, odor may be assessed by a colorimeter and proximity by a sonic device. Notably, an optical device such as a video camera provides a means for assessing several uncooperative identifiers including an optical badge, face, gait, and iris.

FIG. 4C shows ID determinations including cooperative and uncooperative ID determinations 400C. In addition to the uncooperative determinations itemized in the table of FIG. 4B, the combined cooperative and uncooperative ID determinations of the table of FIG. 4C further include magnetic cards assessed by a card reader, fingerprints and palm prints assessed by any of optical, capacitive, magnetic, pressure, thermal, and sonic devices, keypad or keyboard entries, document assessment by an optical device, and voice assessment by a microphone.

FIGS. 5A-B show selected cases for using one or more types or categories of identification in connection with a decision to grant access 500A-B.

FIG. 5A shows use of a single or at least one identification category in connection with a decision to grant access 500A. In particular, case 1 shows that a scannable ID is used, that is an ID that does not require the human that is being identified to cooperate with the assessment and/or that enables scanning without apprising the human that is being assessed with any one or more of i) the assessment, ii) the particular type of identification being assessed, and iii) the method of assessment. Case 2 differs from case 1 in that a cooperative ID is used, that is an ID that requires the human that is being assessed to cooperate as occurs with an ID that is intentionally cooperative for assessment.

FIG. 5B shows use of at least two identification categories in connection with a decision to grant access 500B. Four cases are shown. In multiple ID case 1, first and second IDs are scannable and scannable. In multiple ID case 2, first and second IDs are scannable and cooperative. In multiple ID case 3, first and second IDs are cooperative and scannable. In multiple ID case 4, first and second IDs are cooperative and cooperative. In light of the above, skilled artisans will appreciate the merits of choosing among the cases to fit the environment, circumstances, and objectives associated with the species and/or space to which access is limited.

Identification datasets corresponding to IDs may be selected and/or stored in groups corresponding to function, title such as job titles, authorization such as security level, function such as job function, temporal limitations such as time of day, and the like. Identification datasets may also be selected and/or stored in a manner corresponding to particular individuals.

FIGS. 5C-E show multiple embodiments of ID datasets 500C-E.

FIG. 5C shows ID datasets that are a function as a single variable 500C. In particular, each ID dataset ("IDDS") may be a function of a single variable IDDS(y). The variable "y" represents a selection from among a plurality of different ID types such that each ID dataset is associated with a particular ID type, e.g., IDDS(ID Type 1), IDDS(ID Type 2), IDDS(ID Type 3).

Where ID datasets are a function of a single variable, access may be granted when the access manager 100, 200 acquires data from an acceptable ID that can be successfully matched with IDDS(y). For example, where an acceptable ID type is a magnetic card and data the access manager 100, 200 acquires from such a card can be matched with IDDS (y), e.g., a stored 106, 108 IDDS(y), access may be granted. Notably, the type of transducer or transducers available for acquiring ID data may determine and/or give notice of what is an acceptable ID Type. This feature is useful e.g., where the same ID dataset is used with multiple persons, for example a combination code.

FIG. 5D shows ID datasets that are a function of two variables 500D. In particular, each ID dataset ("IDDS") may be a function of two variables IDDS(x,y). Here, variable "x" may be used to limit the ID Datasets that are available for matching. In an embodiment, "x" refers to or is associated with a particular person and "y" represents a selection from among a plurality of different ID types such that IDDS(x,y) is IDDS(particular person, particular ID Type). This feature supports e.g., ID datasets such as biometric datasets that vary according to the person.

Where ID datasets are a function of two variables, access may be granted when the access manager 100, 200 acquires data from an acceptable ID that can be successfully matched with an IDDS(x,y). For example, where an acceptable ID type is a magnetic card and data the access manager 100, 200 acquires from such a card can be matched with IDDS(x,y), e.g., a stored 106, 108 IDDS(x,y), access may be granted. Notably, a database or another data structure may store a representation or equivalent of the table 500D such that for any tabulated person, selecting a particular tabulated column "y" determines the same ID Type. That is, for example, IDDS(x,1) determines ID Type 1, IDDS(x,2) determines ID Type 2, and IDDS(x,3) determines ID Type 3.

FIG. 5E shows ID datasets that are a function of two variables 500E. In this embodiment, the ID Types found in a particular tabulated column may vary. Here, the tabulated columns are marked by index values 1, 2, 3 such that selection of ID datasets from a particular tabulated column may result in different ID Types. For example, IDDS(Person 1,1) may be an ID dataset corresponding to ID Type 1 while IDDS(Person 2,1) may be an ID dataset corresponding to ID Type 2. Here, the ID datasets IDDS(x,y) may include or reference, inherently or otherwise, indicia which reveal the ID Type. This feature supports e.g., use of ID Type(s) by one person that are not used by another person, for example Person 1 uses ID Types (face, magnetic card, passport) while Person 2 uses ID Types (fingerprint, optical card, passport).

FIGS. 6A-D show flowcharts 600A-D illustrating algorithmic steps taken by various embodiments of an access manager 100, 200. For example, algorithmic steps executed by a processor or processors of the access manager 100, the controller 220, or the extended network 230. For a selected algorithm, all or fewer than all of the steps shown may be stored in memory 106 and executed on a processor 104.

Figure 6A:
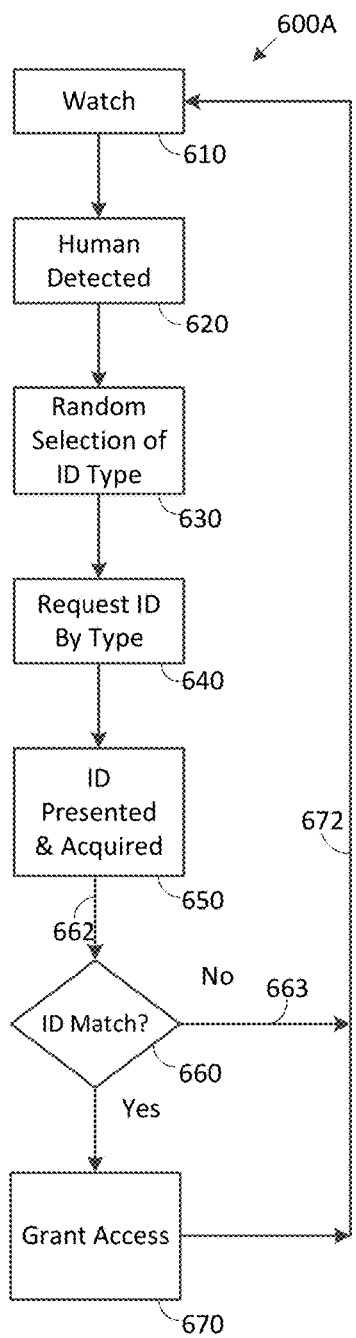
FIGS. 6A-D show flowcharts of algorithms for use with the access manager of FIG. 1.
Figure 6B:
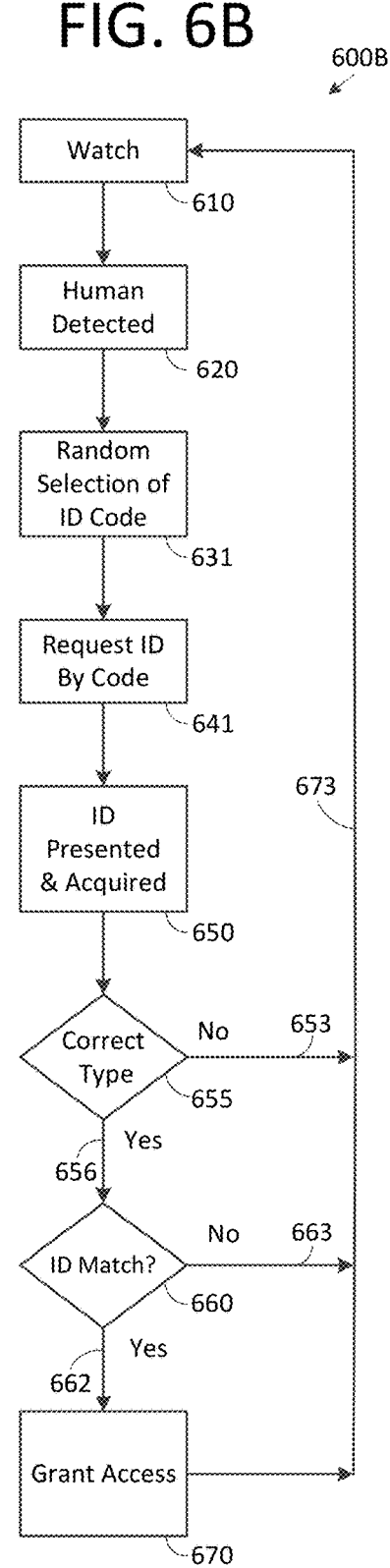

FIGS. 6A-B may utilize ID datasets that a function of at least one ID or ID type. See e.g., FIG. 5C.

FIG. 6A shows a flowchart illustrating a first algorithm 600A. In a step 610, the algorithm watches for a person and/or indicators that a person is present. The algorithm may use watch means. Watch means may utilize scannable and/or cooperative ID such as ID types recognizable via any corresponding transducer(s) as mentioned above. For example, a proximity transducer or a directional proximity transducer may be used to recognize the presence of a person as in recognizing a person positioned in a particular location.

For example, a camera may be used to recognize the presence of a person via determining the presence of a biometric identification such as a humanoid face or face in motion. For example, a keypad entry may be used to recognize the presence of a person via determining that a key or code or a particular key or code has been entered.

As a result of the watch step 610, the presence of a person may be detected 620. This leads to a selection of an ID type and/or ID dataset. In an embodiment, the selection may be a random or pseudo random ("RPR") selection 630 of an ID type and/or ID dataset from among a plurality of ID types and/or ID datasets 400A. See for example FIG. 5C where an RPR selection may be from a plurality of ID datasets IDDS(ID Type y) where "y" is an integer in a range corresponding to the number ID Types available.

Following the selection of a particular ID type, the access manager 200 may request, prompt for, and/or otherwise make available a facility for the person to provide a particular ID 640 from which the access manager acquires data. For example, where there is a request for a magnetic card ID, a magnetic card reader provides a facility for entry and/or presentation 650 of the requested ID. For example, where there is a request for a fingerprint, a fingerprint reader provides a facility for entry of the requested ID. As mentioned above, one or more transducers (e.g., fingerprint reader, magnetic card reader) in a transducer block 110 may be colocated or located in different locations.

In another embodiment, the person is not given notice of the random or RPR selected ID type 630. Rather, the RPR selected ID type is a scannable ID that is obtained surreptitiously such that the person is unaware of the ID type involved and in cases unaware that an ID is being acquired. Here, the RPR selection may be from ID types limited to scannable ID types.

Matching processes 660 include non-directed and directed matching.

In non-directed matching, neither of ID Type nor ID dataset depend upon information acquired by the access manager 100, 200 during the watch step 610. For example, where a proximity sensor is used in the watch step.

Here, the ID dataset may be determined by an RPR selection from all of or from a selected group of ID types stored in a library such as ID library 108 and available to processor 104. See e.g. FIG. 5C.

In directed matching, selection of the ID type depends at least in part on information acquired by the access manager 100, 200 during watch step 610. For example, where an RF badge is used in the watch step.

Here, the watch step may identify the person as a particular person or a person belonging to a particular group, e.g. by name, number, or other characteristic(s). The particular type or form of ID to be requested may then be an RPR selection from a plurality of available ID types. For example, in FIG. 5D where ID Types do not vary from person to person, the ID type is an RPR selection from the ID types shown in the column headings 504. With the person's identification 502 from the watch step, the identification dataset IDDS(Person, ID Type) 506 is found.

Where ID types do vary from person to person, FIG. 5E provides yet another example. Here, given a particular person 512, three IDDS entries are determined 514. An RPR selection of one of these entries 516 provides the IDDS to be used in the matching process. Further, the selected IDDS determines the corresponding ID type either directly, indirectly, inherently, or in another suitable manner.

Matching processes 660 may utilize one or more different matching success criteria. A match may be judged successful when a transducer 110, 208 acquires ID data from the person's ID and this acquired data matches IDDS(ID Type y). A match may be judged successful if the acquired ID type and the acquired ID data matches ID Type y and IDDS(ID Type y). A match may be judged successful if the acquired ID type matches ID Type y.

In various embodiments, to the extent selected match criteria are met 662, access to a guarded species or space is granted to the person, to another person, and/or to some instrumentality such as a machine 670. The grant of access may be followed by a return to the watch step 672. To the extent selected match criteria are not met 663, access is not granted and the process may return 672 to the watch step 610.

FIG. 6B shows a flowchart illustrating a second algorithm 600B. The flowchart of 600B is similar to that of 600A. However, flowchart 600B differs from flowchart 600A because it requires that a particular type of ID be presented in response to a code used to request the ID. For example, where "boxwood" and "underwood" are codes referring to particular different ID types, a request for the "boxwood ID" may be code indicating that a magnetic card should be presented while a request for the "underwood ID" may be code indicating that a keypad entry should be presented.

The flowchart differences include substitution of step 631 for step 630, substitution of step 641 for step 640, and addition of step 655.

In step 631, the access manager 200 makes an RPR selection to determine a particular (ID code:ID type) pair. The table of FIG. 5C may be adapted to include or associate ID codes and respective ID types. In step 641, the access manager 200 utilizes the ID code to request presentation of the paired ID type.

Added step 655 determines if the presented ID is the ID type that was requested using the ID code. If the correct ID type was presented 656, the process proceeds to an ID match step 660. If the correct ID type was not presented 653, the process may return 673 to the watch step 610.

Figure 6C:
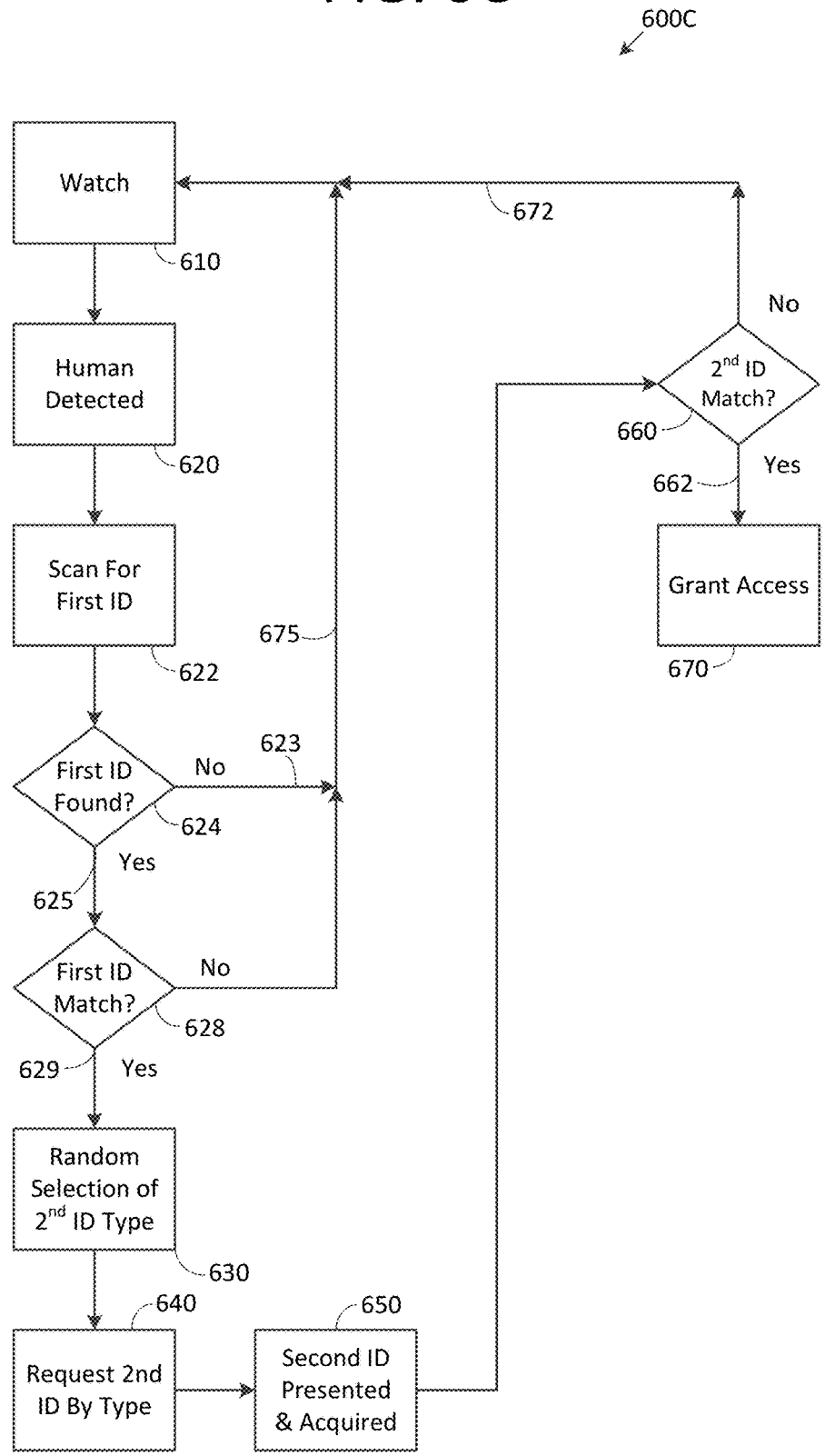
Figure 6D:
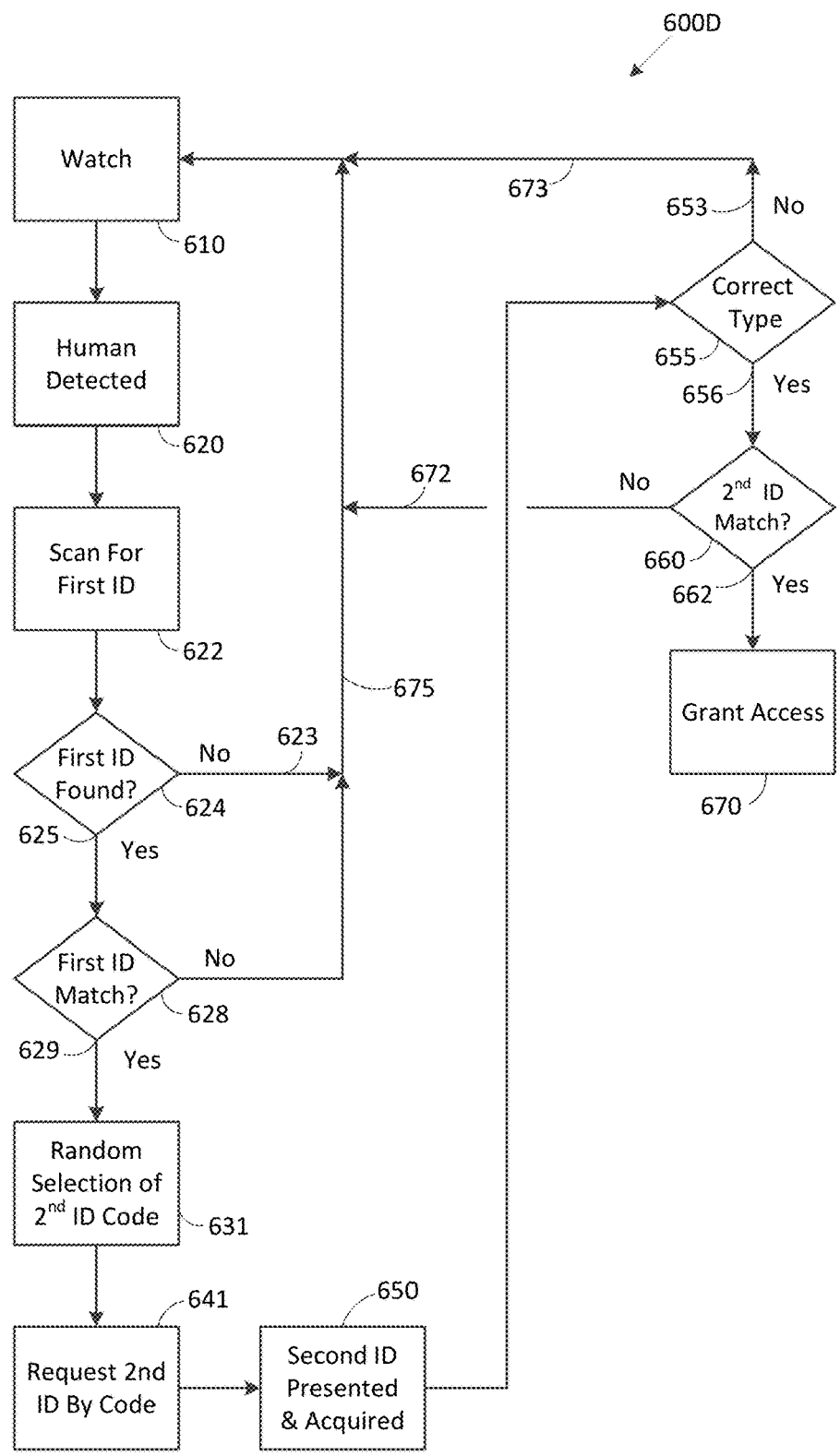

FIGS. 6C-D may determine ID datasets based on at least two identifications or ID types. See e.g., FIGS. 5D-E.

FIG. 6C shows a flowchart illustrating a third algorithm 600C. The flowchart of 600C is similar to that of 600A. However, flowchart 600C differs from flowchart 600A because it utilizes two ID's. In some embodiments, the first ID is a scannable ID, for example a face, and the second ID is a cooperative ID such as a passport.

The flowchart differences include new steps 622, 624, 628. Following the watch step 610, added step 622 scans for a first ID, for example for a scannable ID acquired surreptitiously. Following step 622, added step 624 tests whether the first ID was found and if so tests for a match in step 628. To the extent the first ID is not found 623, the process may return 675 to the watch step. To the extent the first ID is found 625 and a match is successful 629, an RPR selection of a second ID type follows in step 630 that follows.

FIG. 6D shows a flowchart illustrating a fourth algorithm 600D. The flowchart 600D is similar to a combination of flowcharts i) 600B using ID codes and ii) 600C using first and second ID's.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. An access manager for arbitrating access of credentialed persons to a guarded space, the access manager comprising:
   a controller including a processor for processing digital information and a memory coupled with the processor, the memory for storing an ID library;
   a transducer block coupled with the processor, the transducer block for accessing a plurality of different ID types;
   an actuator block coupled with the processor, the actuator block for unlocking a normally locked portal to the guarded space;
   for plural persons authorized to access the guarded space, a security protocol that specifies each such person possess ID's that provide multiple different ID types;
   for the possessed ID's, respective ID datasets stored in the ID library;
   a candidate for entry into the guarded space and a prompt to present a form of identification randomly selected from that person's possessed ID types;
   in an autonomous operation before the prompt, the candidate is scanned for a first ID of a first type and a comparison and match of i) information from the first ID with ii) data in an ID dataset is required before the actuator block will unlock the normally locked portal; and,
   the prompt expresses a particular ID type different from the first type and a comparison and match of i) information from a presented ID with ii) data in an ID dataset is required before the actuator block will unlock the normally locked portal.

2. The access manager of claim 1 where each person authorized to access the guarded space possesses >=3 different ID types.

3. The access manager of claim 2 wherein the first ID utilizes facial recognition and the prompt requires information from an ID card.

4. The access manager of claim 3 wherein:
   the autonomous operation associates the candidate with particular ID types and with particular ID datasets corresponding to the ID types; and,
   the ID dataset associated with the prompt is a dataset associated with the candidate.

5. An access manager for arbitrating access of credentialed persons to a guarded space, the access manager comprising:
   a controller including a processor for processing digital information and a memory coupled with the processor, the memory for storing an ID library;
   a transducer block coupled with the processor, the transducer block for accessing a plurality of different ID types;
   an actuator block coupled with the processor, the actuator block for unlocking a normally locked portal to the guarded space;
   for plural persons authorized to access the guarded space, a security protocol that specifies each such person possess ID's that provide multiple different ID types;
   for the possessed ID's, respective ID datasets stored in the ID library;
   a candidate for entry into the guarded space and a prompt to present a form of identification randomly selected from that person's possessed ID types;
   the prompt expresses a code to the candidate, the code selected from codes corresponding to respective ID types;
   the code known to the candidate to correspond to a particular one of the ID types; and,
   a comparison and match of i) information from a presented ID with data in an ID dataset corresponding to the code is required before the actuator block will unlock the normally locked portal.

6. The access manager of claim 5 where each person authorized to access the guarded space possesses >=3 different ID types.

7. An access manager for arbitrating access of credentialed persons to a guarded space, the access manager comprising:
   a controller including a digital processor and a memory coupled with the processor, the memory for storing an ID library;
   a transducer block coupled with the processor, the transducer block for accessing a plurality of different ID types;
   an actuator block coupled with the processor, the actuator block for unlocking a normally locked portal to the guarded space;
   for plural persons authorized to access the guarded space, a security protocol that specifies each such person possess ID's that provide multiple different ID types;
   for the possessed ID's, respective ID datasets stored in the ID library;
   a candidate for entry into the guarded space and a prompt to present a form of identification randomly selected from that person's possessed ID types;
   in an autonomous operation before the prompt, the candidate is scanned for a first ID of a first type and a comparison and match of i) information from the first ID with ii) data in a first ID dataset is required before the actuator block will unlock the normally locked portal;
   the prompt expresses a code selected from a set of multiple codes corresponding to respective ID types, the code known to the candidate to correspond to a particular one of the ID codes possessed by the candidate; and,
   a comparison and match of i) information from a presented ID with ii) data in a second ID dataset corresponding to the code is required before the actuator block will unlock the normally locked portal.

8. The access manager of claim 7 where each person authorized to access the guarded space possesses >=3 different ID types.

9. The access manager of claim 8 wherein:
   the autonomous operation associates the candidate with particular ID types and with particular ID datasets corresponding to the ID types; and,
   the second ID dataset is a dataset associated with the candidate.

10. An access manager for arbitrating access of credentialed persons to a guarded space, the access manager comprising:
    a controller including a digital processor and a memory coupled with the processor, the memory for storing an ID library;
    a transducer block coupled with the processor, the transducer block for accessing a plurality of different ID types;

an actuator block coupled with the processor, the actuator block for unlocking a normally locked portal to the guarded space;

for plural persons authorized to access the guarded space, a security protocol that specifies each such person possess ID's that provide multiple different ID types; and, for the possessed ID's, an ID dataset stored in the ID library;

wherein information on an ID possessed by a candidate seeking access is compared with data in the ID library that depends on the candidate's identity x.

11. The access manager of claim 10 where each person authorized to access the guarded space possesses >=3 different ID types.

12. The access manager of claim 11 wherein (i) the dataset further depends on a random selection y from among a plurality of ID types and ii) a match between the information on the possessed ID and the ID dataset data is required before the actuator block will unlock the normally locked portal.

13. The access manager of claim 11 wherein (i) the ID dataset further depends on a random selection y from among a plurality of ID types z where z is a function of x and ii) a match between the information on the possessed ID and the ID dataset data is required before the actuator block will unlock the normally locked portal.

14. The access manager of claim 13, wherein the candidate is identified by an autonomous scan via a video camera and facial recognition.

\* \* \* \* \*